Nov. 24, 1953 H. G. BECK 2,659,940
REFRIGERATOR GASKET
Filed Dec. 17, 1949 2 Sheets-Sheet 1
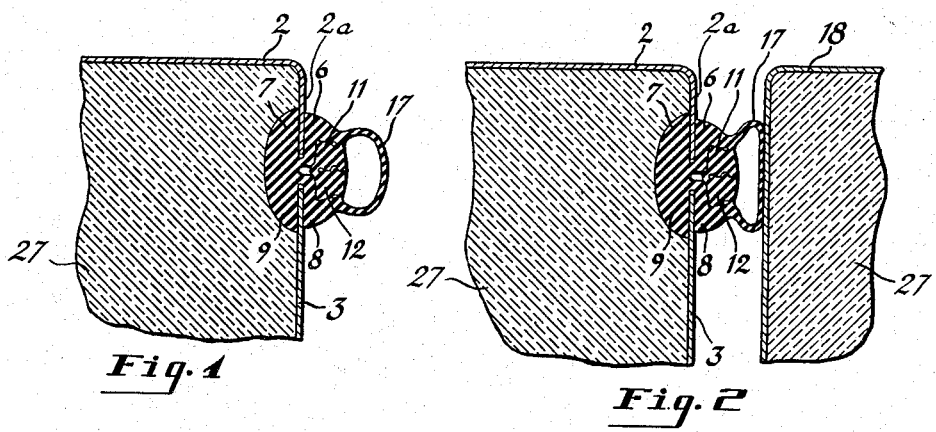
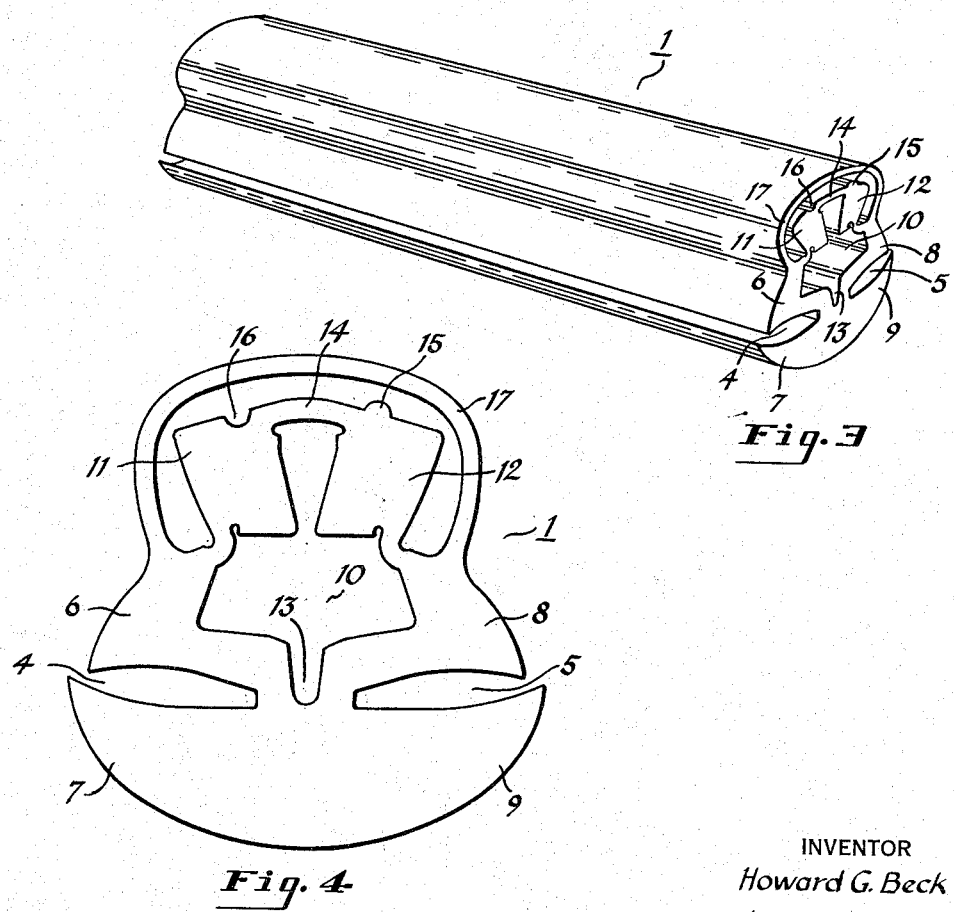
INVENTOR
Howard G. Beck
BY Evans + McCoy
ATTORNEYS Nov. 24, 1953  H. G. BECK  2,659,940
REFRIGERATOR GASKET
Filed Dec. 17, 1949  2 Sheets-Sheet 2

INVENTOR
Howard G. Beck
BY
Evans & McCoy
ATTORNEYS

Patented Nov. 24, 1953

2,659,940

UNITED STATES PATENT OFFICE 2,659,940

REFRIGERATOR GASKET

Howard G. Beck, Wabash, Ind., assignor to The General Tire and Rubber Company, Akron, Ohio, a corporation of Ohio Application December 17, 1949, Serial No. 133,652

3 Claims. (Cl. 20—35)

This invention relates to a rubber seal or gasket for use as a closure unit in connection with rubber mountings for joining adjacent edges, and in particular this invention relates to a mounting and seal combination for use on refrigerator doors.

Adjacent panel edges are often joined together by a linear rubber mounting having opposed channels or grooves for receiving the panel edges and means by which to expand the mounting body and cause it to grip and hold the panel edges firmly in the channels. In some cases, an additional closure unit or sealing means is required to seal the panel thus formed against a third surface. Examples of this are refrigerator doors and the tops and lids of insulated chests and boxes.

In refrigerators, insulated chests and the like it is also desirable to provide a break between the continuity of the inside of the door or lid and the outside surface so that heat is not conducted through the door frame or panels from the surrounding atmosphere into the cooling unit. When the inner and outer panel edges are separated by a rubber mounting, just such an insulative break is achieved. Until the present time, however, no satisfactory means has been found by which to install a seal or gasket in conjunction with a rubber mounting.

Much of the difficulty lies with the structure of the seals or gaskets. By far the most satisfactory seals are the type with a central hollow portion. This hollow forms a dead air space around the door or panel in which it is installed and insulates the interior of the unit from the surrounding atmosphere. At the same time, it gives the seal or gasket a compressible and resilient structure which allows a large width of gasket to flatten against the surface with which it engages and thus it insures an adequate seal. The principal disadvantage with a hollow gasket, however, is that it cannot be bent or shaped around corners and the like without causing it to crimp and to collapse upon itself. To prevent this crimping and collapsing, the corners and bends in the form of the seal required by the various sized doors and panels to which it has to fit have to be made and spliced in after extrusion and then set and cured or vulcanized. This, of course, requires that each gasket be custom built for its particular door or panel and that a large number of gaskets be made. Furthermore, this necessitates considerable added expense in manufacturing the gaskets and causes complications in the assembling of them.

One object of this invention is to develop a hollow seal or gasket inexpensively manufactured and easily assembled for use on refrigerator doors and bent to a desirable contour without crimping.

Another object is to provide means of forming hollow gaskets to panel outlines without causing their collapse.

Another object is to minimize expense and complication in the assembly of structures such as refrigerator doors requiring both a linear rubber mounting member for joining edges of door components together and also a linear rubber closure seal to seal the air space between peripheral portions of the door and cabinet.

Other objects and advantages will become apparent upon examination of the accompanying drawings in which like parts are denoted by like numerals.

Figure 1 is a cross-sectional view through two panels, a refrigerator door frame and the inside door panel, joined by the rubber mounting and seal of this invention.

Fig. 2 is a cross-sectional view of the door frame and inside panel of Fig. 1 in which the door seal abuts the refrigerator body frame and the door is in the closed or sealed position.

Fig. 3 is a perspective view of the mounting and seal of this invention as supplied in the extruded form prior to assembly with the panel edges.

Fig. 4 is an enlarged cross-sectional view of the mounting and seal taken along line 4—4 in Fig. 3. This figure shows the mounting shape in the unlocked position and shows the relationship of the integral seal to it.

Figure 5:
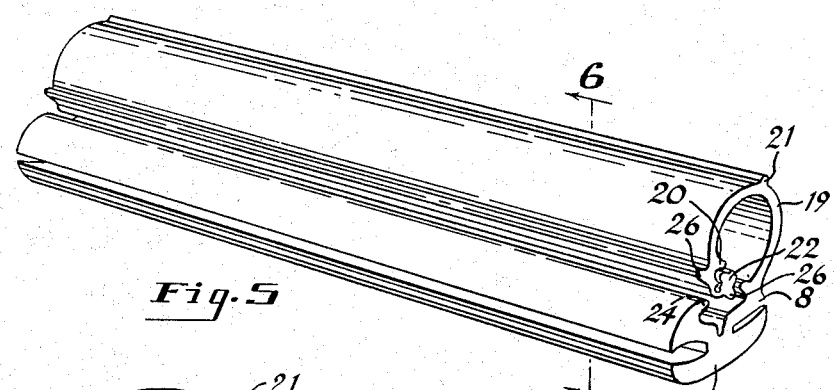
Fig. 5 is a perspective view of a modification of the mounting and seal as extruded and supplied prior to assembly with the panel edges.
Figure 6:
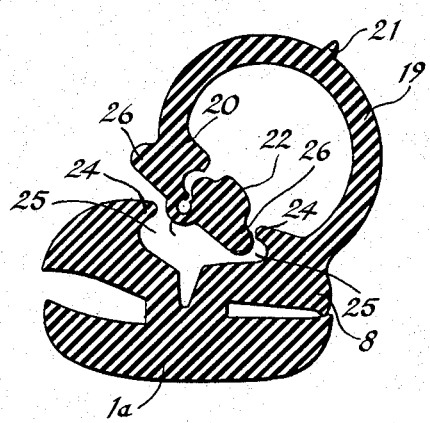
Fig. 6 is an enlarged cross-sectional view taken along line 6—6 in Fig. 5 of the modification of Fig. 5 as extruded, prior to assembly with the panel edges. The mounting and seal in this view are in the unlocked or unassembled position.
Figure 8:
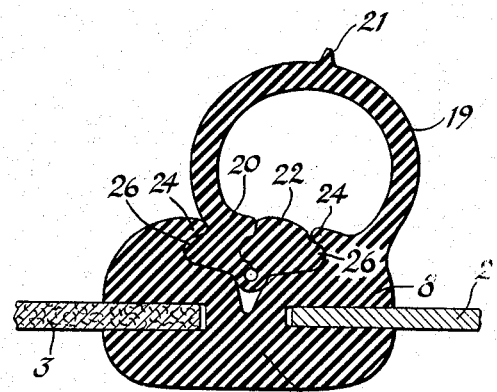
Fig. 8 is an enlarged cross-sectional view taken along line 8—8 of Fig. 7 of the mounting of Fig. 5 showing the composite seal (sealing portion and mounting portion) as it is in the locked or assembled position with the two panel edges.

Referring more particularly to Fig. 1, it can be seen that the seals of the present invention comprise a linear mounting portion 1 adapted to join together edges of panel like members such as components of a door and an integral sealing or gasket portion 17. The mounting portion surprisingly controls the operation of the sealing portion for it is found that the aforementioned objectionable crimping and collapsing of the sealing portion may be avoided when the seal is integral with a resilient mounting of more massive and thicker sections so that the stress necessary to compress it a small amount is far greater than that necessary to compress or elongate the seal a like amount. The massive mounting body thus stiffens and braces the seal and reduces the tendency for it to collapse when formed and bent.

The flanges or groove-forming portions of the mounting body 6 and 7 together with an intermediate connecting portion 15, define the groove or channel 4 and the flanges 8 and 9 together with a portion 15 define the groove 5. The grooves are generally oppositely disposed to each other or back to each other and act in the same planes or planes parallel to each other. That is, the grooves are roughly aligned with the plane passing through the mid-points at the inner-most portion of each groove.

The inner surface of each flange is preferably inwardly curved or concave to enable the flanges to grip and hold the panel edges throughout the width thereof. This also eliminates any tendency for the gripping force of the flange to act only at the base or root of the groove.

Intermediate the grooves or channels 4 and 5 and outward, and generally to one side of their median plane is a longitudinal hollow or cavity 10. The walls of the hollow 10 are shaped to receive the toggle elements 11 and 12 and may have an inner V shaped extension 13 to provide increased flexibility.

The toggle elements 11 and 12 are of sufficient thickness to be stable against transverse bending or folding on themselves. That is, they have sufficient mass and thickness to withstand strong compression without folding. Substantially all bending and flexing is thereby taken by the hinge portion connecting the toggle elements together or to the main portion of the mounting portion 1.

When the mounting is in the open, or unlocked position as shown in Fig. 4, on one side of the said median plane, the flanges 6 and 8 are fully flexible to and from each other and can be bent to open the channels 4 and 5 for easy reception of the panel edges. The flanges 6 and 8 are bendable toward each other relatively easily because there is no intervening mass or body of material. At the same time, the flanges 7 and 9 are relatively stiff and immovable because the mounting body portion between them is solid.

One function of the toggle elements 11 and 12 is to fill the hollow or cavity 10 after the panel edges 2 and 3 have been inserted in the channels 4 and 5 so that the flanges 6 and 8 are stiffened and a pressure is maintained upon the panel edges by the flanges. The toggle elements and the main portion of the mounting member are hinged together by at least two hinge portions shown in Figs. 1 to 4 inclusive, they are hinged to the main body mounting portion along the edges of the hollow and are hinged or pivoted to each other along the central outward portion 14. Thus after the panel edges have been placed in the channels 4 and 5, the toggle elements can be pressed and sprung into the hollow 13 and at the same time expand the mounting and fill out the hollow. These toggle elements operate on a principle similar to the mechanical toggle linkage with the side hinges corresponding to the side pivot points of the linkage and the central pivot or hinge corresponding to the central pivot of the toggle. This toggle linkage generates much sideways thrust from the downward force applied. In this mounting, the sideways thrust acts against the flanges 6 and 8, which in turn pivot at their inner junction with the mounting body and bear strongly against the panel edge portions in the grooves 4 and 5. In order to help hold the toggle elements in the locked position in the hollow 10, one toggle has a bead or linear raised portion 15 along the outer face and the other toggle has a corresponding groove or linear gouge 16 along its outer face so that the two interfit in the locked position.

A major feature of the present invention is the integral gasket or sealing portion 17 which is incorporated with the mounting portion 1, and cooperates with the mounting portion to form a tube having relatively thick walls on one side thereof and an easily deformable wall on an opposite side. This gasket or sealing portion 17 is formed integrally with and extruded as a part of the mounting and consequently is composed of the same rubber as the mounting. The general shape of the gasket is arcuate or preferably ovate with a relatively flatter top. The gasket or seal may join the mounting at the flanges 6 and 8 and arches over the intermediate toggle elements when they are in the unlocked position. The gasket outline shape will naturally vary with the wall thickness and other factors, but it should be resilient enough and present a substantial sealing width to the panel surface against which it acts. Fig. 2 illustrates the action of the seal against a panel surface 18 which in this case is the refrigerator body frame. For proper resiliency when in contact with the sealing surface, the gasket preferably has relatively thin-walls as shown. The thin walls allow the gasket to collapse somewhat and present considerable width to the panel surface against which it seals.

Thin walls are also desirable for this invention because they allow manipulation of the toggle elements through them. No special tool or considerable pressure is required to force the toggle elements into position as in the case when a one piece wedge strip or filler strip is forced into an opening to spread it. The toggle element, however, may be easily locked by hand or thumb pressure transmitted through the seal wall. In this fashion the special action of the toggle element is used to best advantage in combination with a sealing portion which corresponds in function to the portion 17 of Figs. 1 to 4 and which is also one of the hinges of the toggle elements connecting the toggle elements 20 and 22. These toggle elements generally correspond to the toggle elements 11 and 12 of Figs. 1 to 4 and the main portion of the mounting member 1a corresponds to the mounting member 1. The sealing portion 19 extends and arches from the surface of flange 8 out over the toggle elements and the toggle receiving hollow 23 to the outer surface of the more remote toggle 20. A rib or raised portion 21 on the outer generally central part of the sealing element 19 may be provided to give a line of contact against the opposing panel body to insure complete closure and to provide a flexing action at the time when wiping of the gasket against the cabinet occurs. The natural resiliency of the gasket gives an outward force which is concentrated along this rib so that the rib presses firmly against the opposite surface and a line of sure contact is created. The rib itself should be preferably flexible but sufficiently stubby to prevent collapse.

In this modification the toggle elements 20 and 22 are joined or hingedly connected only by the arching gasket portion 19 to the body of the mounting. The left toggle element 20 is hinged or pivotally attached directly to the right toggle 22 by the linear hinge 23. The sides of each toggle element fit into longitudinal cups or curved channels 25 along the side walls of the hollow and rotate or pivot therein. Above or outward from these cups 25 are linear overhanging lips 24 under which suitable portions such as the beads 26 of the toggle sides fit as they rotate. It is seen that in this way the toggle elements become directly hinged to the main body of the mounting member and the same toggle linkage is developed as that of the first modification.

Figure 7:
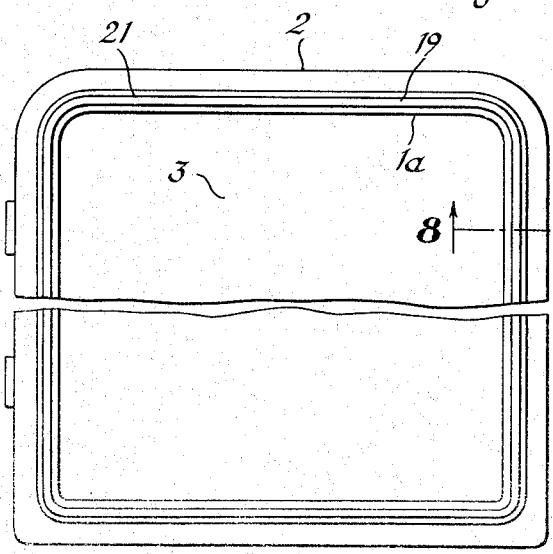
Fig. 7 is a partial front view of the inner face of a refrigerator door with the inside panel thereof installed by the mounting of the modification of Fig. 5. This view shows the door frame, mounting, and inside panel as assembled.

In refrigerator doors illustrated in Figs. 1, 2 and 7 the mounting 1 or 1a joins the edge of the door frame 2 with the edge of the inside panel 3. The mounting 1a is a continuous length around the panel edge and forms the sole means for attaching it firmly to the frame 2. The door frame 2 is preferably made of sheet steel or other metal with an enamelled or vitreous finish and an outward curving or convex front face (not shown) and side flanges 2a bent back into a U shape so that there is an inturned open edge substantially about the entire peripheral portion of the door frame. The inturned portion of the side flanges 2a are generally parallel to the plane of the front of the refrigerator body when the door is closed. The inside panel 3 is preferably flat fiberboard or other non-heat-conductive material and fits into the opening in the inner face of the door frame, to cooperate with the door frame and integral outer door portion to completely enclose the insulation 27. The edges on both the door frame and panel do not have to be finished edges but do have to correspond roughly, taking into account the distance between the opposing grooves of the mounting portion of the sealing element. The grooves on either side of the mounting receive the panel edges and hold them as previously described.

Figure 7 particularly illustrates the inner face of an assembled door and shows how the sealing portion 19 of the mounting 1a extends around the periphery of the inner panel to give a complete heat seal against the refrigerator body frame. The seal itself flattens against the body frame and excludes air and insulates against heat. It may be seen that the mounting 1 of Figs. 1-4 fits onto the refrigerator door in the same manner as the mounting 1a shown in Fig. 7 and acts in approximately the same way.

The mountings and seals shown in this description are intended primarily for use on refrigerators, cabinets, and frozen food units, but they are equally serviceable under any conditions in which adjacent panel edges need to be joined and a seal or closure against a third panel surface is required. In other words, only preferred embodiments of the invention have been illustrated and described. Other embodiments may be made within the invention as provided by the patent statutes.

What I claim is:

1. A mounting for joining panel edges comprising a linear body of rubberlike material with opposing grooves therein to receive panel edges, a longitudinal opening intermediate the grooves, and two cooperating toggle joint elements for insertion into said opening so that after the panel edges have been fitted into the opposing grooves said toggle joint elements are inserted into said opening to thereby expand the body of the mounting into tight gripping engagement with the panel edges, and a hollow ovate seal element formed integrally with the mounting body adjacent one edge of said longitudinal opening spanning one of said toggle joint elements and formed integrally with the other toggle joint element along the outer portion thereof.

2. A flexible linear mounting of rubberlike material for joining adjacent panel edges comprising a body portion of uniform cross-section with two spaced and generally opposite linear channels therein, a longitudinal opening in said body intermediate said channels, and a toggle joint of two interfitting sections pivotal together lengthwise, said toggle joint sections and said opening being proportioned so that said toggle joint sections can be pressed together and sprung into said opening to thereby compress portions of the body of the mounting around the edge portions of the panels in said channels to hold said edge portions firmly and to cause said toggle joint sections to be held and locked in said opening by resulting force exerted from the body of the mounting upon them, and a hollow bead structure integral with said mounting and arching from the mounting body adjacent the longitudinal opening therein to the outer portion of said toggle joint.

3. A flexible linear mounting of rubberlike material for joining adjacent panel edges comprising a body portion of uniform cross-section with two spaced and generally opposite linear channels therein, a longitudinal opening in said body intermediate said channels, and a toggle joint of two interfitting sections pivotal together lengthwise, said toggle joint sections and said opening being proportioned so that said toggle joint sections can be pressed together and sprung into said opening to thereby compress portions of the body of the mounting around the edge portions of the panels in said channels to hold said edge portions firmly and to cause said toggle joint sections to be held and locked in said opening by resulting force exerted from the body of the mounting upon them and a relatively thin-walled, linear structure integral with the mounting and arching from the mounting body at one side of the longitudinal opening to the outer portion of said toggle joint on the side most removed from the side of the point of juncture of said structure with the mounting body.

HOWARD G. BECK.

References Cited in the file of this patent

UNITED STATES PATENTS

| Number | Name | Date |
|---|---|---|
| 1,998,791 | Schanz | Apr. 23, 1935 |
| 2,056,024 | Stuart | Sept. 29, 1936 |
| 2,189,138 | Eichner | Feb. 6, 1940 |
| 2,215,889 | Swedman | Sept. 24, 1940 |
| 2,288,329 | Smith | June 30, 1942 |
| 2,347,847 | Swedman | Mar. 11, 1944 |
| 2,350,430 | Ulrich | June 6, 1944 |
| 2,430,873 | Haas | Nov. 18, 1947 |
| 2,492,566 | Geyer | Dec. 27, 1949 |
| 2,607,966 | Beck | Aug. 26, 1952 |